United States Patent [19]

Shively

[11] 4,351,845
[45] Sep. 28, 1982

[54] METHOD OF INCREASING FEED EFFICIENCY IN SWINE

[75] Inventor: Jesse E. Shively, Terre Haute, Ind.

[73] Assignee: Pfizer Inc., New York, N.Y.

[21] Appl. No.: 243,105

[22] Filed: Mar. 12, 1981

[51] Int. Cl.$^3$ ............................................. A61K 31/35
[52] U.S. Cl. .................................................... 424/283
[58] Field of Search ........................................ 424/283

[56] References Cited

U.S. PATENT DOCUMENTS 3,715,372 2/1973 Stempel ............................ 260/345.8
3,947,586 3/1976 Messersmith ....................... 424/283

OTHER PUBLICATIONS

McDougald–Chem. Abst. vol. 92 (1980), p. 208,898f.

*Primary Examiner*—Sam Rosen
*Attorney, Agent, or Firm*—Charles J. Knuth; James H. Monroe

[57] ABSTRACT

Oral administration of lasalocid to swine in the grower and finisher phases of their life cycle results in an increase in the rate of growth and in the efficiency of feed utilization.

4 Claims, No Drawings

4,351,845

METHOD OF INCREASING FEED EFFICIENCY IN SWINE

BACKGROUND OF THE INVENTION

The present invention relates to a method of increasing the rate of growth and the efficiency of feed utilization in swine during the grower and finisher phases of their growth cycle.

It is well known that the oral administration of certain organic compounds, for example 3-(2-quinoxalinylmethylene)carbazate-$N^1,N^4$-dioxide, and many antibiotics increases either the rate of growth or the efficiency of feed utilization in swine, and in some cases both effects are observed. It has, however, heretofore been understood in the art that the effect of antibiotics on the rate of growth and efficiency of feed utilization in swine decreases with increasing age and size of the animals and is economically most significant in the starter phase of the animal's life i.e. from the time the pig is weaned to about 25 kg in weight. Accordingly, it has not heretofore been possible to fully realize the potential economic benefits of increasing the rate of growth and the efficiency of feed utilization in swine during the later stage of the grower phase (i.e. from about 35 kg to about 60 kg body weight) and during the finisher phase (i.e. from about 60 kg to market weight) of the growth cycle by administration of an antibiotic.

U.S. Pat. No. 3,947,586 discloses that lasalocid is useful in the treatment of swine dysentery.

SUMMARY OF THE INVENTION

It has now been found that oral administration of lasalocid unexpectedly significantly increases the rate of growth and the efficency of feed utilization in swine during the grower and finisher phases, especially in pigs weighing more than about 35 kg. Contrary to the effects heretofore experienced with other antibiotics used for growth promotion in swine, such as Tylosin and Virginiamycin, the increase in the rate of growth and in the efficiency of feed utilization is significantly greater during the grower and finisher phases of the growth cycle than during the starter phase. In particular, a significant increase in the rate of growth and in the efficiency of feed utilization is realized by the addition of lasalocid to swine in the finisher phase of the growth cycle i.e. in animals weighing more than about 60 kg.

Accordingly, the present invention comprises a method of increasing the rate of growth and the efficiency of feed utilization by swine comprising orally administering to a pig weighing at least about 35 kg, preferably at least about 60 kg, an effective amount of lasalocid or a physiologically acceptable ester or salt thereof. Preferably the active compound is administered in the feed of the animals in an amount from about 5 to 100 ppm, preferably from about 20 to 60 ppm, based on the total weight of the feed.

DETAILED DESCRIPTION OF THE INVENTION

The compounds useful in the present method for increasing the rate of growth and the efficiency of feed utilization in swine during the grower and finisher phases of their growth cycle are lasalocid, its physiologically acceptable salts and esters, or mixtures thereof. Suitable salts include the alkali metal salts, for example the sodium or potassium salts, the alkaline earth metal salts, such as the calcium or magnesium salts, and the ammonium salts. Suitable esters include the lower alkyl esters having from 1 to 6 carbon atoms. Lasalocid for use in the present process may be prepared by methods well known in the art, for example, as described in U.S. Pat. No. 3,715,372. The active compound may be used in the present method either as the isolated compound or in a form such as the mycelial filter cake which contains the active compound.

Lasalocid, or salts or esters thereof, when administered to swine during the grower and finisher phases in accord with the present process increases the rate of growth and the efficiency of feed utilization. Efficiency of feed utilization as used in the present specification, means the increase in the weight of the animal gained per pound of feed consumed. Rate of growth, as used in the present specification, refers to the increase in weight of the animal per unit of time, regardless of the amount of feed consumed. The lasalocid, or a salt or ester thereof, is administered orally to swine during the grower phase, particularly to pigs weighing at least about 35 kg and in the finisher phase when the pig will weigh at least about 60 kg. The active compound may be orally administered by a variety of methods, but is preferably included in the feed of the swine. The effective dosage amount of the active compound is from about 0.15 to about 5 mg/kg body weight of the animal/day, preferably about 0.8 to about 3.0 mg/kg/day. Concentrations of the active ingredient in the feed to achieve the desired dosage amount will be in the range of about 5 ppm to about 100 ppm, preferably from about 20 ppm to about 60 ppm, based on the total weight of the feed. Such admixtures with the feed are readily prepared by thoroughly mixing a suitable amount of the active compound, with the solid feed, for example grains, such as corn, sorghum, wheat, barley, oats and the like, soya meal, fish meal, etc. together with, if desired, other optional additives conventionally employed in the art, for example trace minerals and vitamins. As recognized by those skilled in the art, swine feeds are different from other feeds, such as cattle feeds. Typically, swine feeds do not contain roughages such as, for example, corn cobs or cottonseed hulls. Furthermore, they do not generally contain urea as a source of nonprotein nitrogen. If desired, the active lasalocid, or ester or salt thereof, may be incorporated in a concentrate or premix which is then combined with the animal feed to provide the desired dosage amount. Such premixes or concentrates may contain from about 0.5 weight percent to about 20 weight percent, preferably from about 5 to 10 weight percent of the active ingredient, and a physiologically acceptable solid or liquid carrier or diluent. Suitable solid materials for this purpose include, for example, soya meal, corn meal, grain husks, calcium carbonate and the like. Liquid diluents include water, physiologically acceptable organic solvents and the like. If desired, such concentrates or premixes may contain other ingredients, such as trace minerals or vitamins. Such concentrates or premixes are then added to the feed of the animal in an amount sufficient to provide the desired concentration in the resulting feed mixture and to provide the desired dosage amounts in the range previously described.

While it is preferred to administer lasalocid in the feed of the animals as described above, it will be understood that other methods of oral administration may also be employed. For example, the compound may be administered in a physiologically acceptable veterinary preparation, for example as a bolus, powder, solution, paste, syrup, or the like, formed by combination of the active compound in an amount sufficient to give the desired dosage amount and a physiologically acceptable solid or liquid diluent or carrier.

The present invention is illustrated by the following example. However it should be understood that the invention is not limited to the specific details of this example. In the swine growing-finishing test described in this example nutritionally adequate basal rations for the weights of the pigs were fed on an ad libitum basis. The basal ration refers to the total feed intake of the pigs, which was in the form of a complete feed ration into which was incorporated in one composition all of the elements constituting the dietary requirements of the animal, and represent the sum of all elements contained in various feedstuffs, concentrates, supplements, mineral, vitamin or medicated premixes or the like which are fed to the animal. The composition and calculated analysis of typical basal rations which may be fed as a complete feed to growing-finishing swine are as shown below in Table 1.

TABLE 1

| | Basal Swine Rations | |
|---|---|---|
| Ingredient | 14% Protein Ration (Fed 35 to 60 kg weight) | 13% Protein Ration (Fed 60 to 91 kg) |
| Ground sorghum, 9% protein | 72.6 | 69.9 |
| Soybean meal, 44% protein | 10.0 | 9.0 |
| Rice bran, 13% protein | 7.5 | 12.0 |
| Fishmeal, menhaden, 60% protein | 2.0 | — |
| Meat and bone meal 50% protein | 2.0 | 2.5 |
| Cane Molasses | 4.0 | 5.0 |
| Soft rock phosphate; 16.5% Ca, 9% P | 0.6 | — |
| Limestone, 38% Ca | 0.3 | 0.6 |
| Iodized salt | 0.4 | 0.4 |
| Vitamin premix[a,b] | 0.5 | 0.5 |
| Trace mineral premix[b] | 0.1 | 0.1 |
| TOTAL | 100.0 | 100.0 |

| Calculated Analyses | 14% Protein Ration (Fed 35 to 60 kg weight) | 13% Protein Ration (Fed 60 to 91 kg weight) |
|---|---|---|
| Protein | 14.2 | 13.2 |
| Fat | 3.3 | 3.7 |
| Fiber | 3.2 | 3.7 |
| Calcium | 0.59 | 0.56 |
| Phosphorus | 0.61 | 0.58 |
| Metabolizable energy (kcal/kg) | 2979 | 2953 |

[a] Contributes the following levels of vitamins per kilogram of ration: vitamin A, 4410 I.U; vitamin D, 441 I.U.; vitamin E, 11. I.U.; vitamin K, 2.2 mg; niacin, 26.4 mg; riboflavin, 3.3 mg; pantothenic acid, 15.5 mg; choline chloride, 1100 mg; vitamin $B_{12}$, 22 mcg.
[b] Contributes the following levels of trace mineral in parts per million: manganese, 120; iron, 40; copper, 4; iodine, 2.4; cobalt, 0.4; zinc, 100; selenium, 0.1

EXAMPLE 1

Pigs used in the test were Conner Prairie-Hampshire-Yorkshire crossbred pigs which had all been fed nutritionally adequate rations containing a common feed additive from weaning until test initiation. When the pigs reached an average weight of about 35 kg, they were allotted into treatment groups of 36 pigs each (three male castrates and three females in each of six pens). Allotment of pigs to pens and treatment groups was on the basis of initial weight, pretest weight gain and litter of origin. All pigs were housed in an open-front shed which covered about one-third of the solid concrete floored pens.

Lasalocid was incorporated into typical basal rations for growing-finishing swine at a level of 50 ppm of the total ration. These were fed for the duration of the study. All pigs were individually weighed and pen feed consumption and feed efficiency were calculated at various interim periods and at trial termination.

Results of this test, which were summarized during the periods when pigs weighed approximately 35 and 60 kg to market weight, were as shown in Table 2.

TABLE 2

Performance Data from 35 and 60 kg to Market Weight with Pigs Fed Lasalocid at 50 ppm of the Ration

| | Average Weight, kg | | Average Days on Test | Average Daily Gain | | Average Daily Feed, kg | Feed Efficiency | |
|---|---|---|---|---|---|---|---|---|
| Feed | Initial | Final | | kg | % Imp. | | F/G | % Imp. |
| ~ 35 kg to Market Weight | | | | | | | | |
| Nonmedicated control | 35.6 | 91.0 | 70.3 | 0.79 | — | 2.82 | 3.56 | — |
| Lasalocid, 50 ppm | 35.5 | 91.5 | 66.2 | 0.85 | 7.3 | 2.88 | 3.40 | 4.9 |
| ~ 60 kg to Market Weight | | | | | | | | |
| Nonmedicated control | 57.5 | 91.0 | 42.3 | 0.80 | — | 3.04 | 3.80 | — |
| Lasalocid, 50 ppm | 58.7 | 91.5 | 38.2 | 0.87 | 8.8 | 3.07 | 3.55 | 7.2 |

The test indicates that lasalocid improved efficiency of feed utilization from nonmedicated animals when incorporated into the complete ration at 50 ppm.

I claim:

1. A method of increasing the rate of growth and the utilization of feed in swine comprising orally administering to a pig weighing at least about 35 kg during the grower and finishes phases of the growth cycle an effective amount of lasalocid or a physiologically acceptable ester or salt thereof.

2. A method according to claim 1 wherein the pig weighs at least about 60 kg in the finisher phase.

3. A method according to claim 1 wherein lasalocid is administered in the feed of said pig in an amount from about 5 p.p.m. to 100 p.p.m.

4. A method according to claim 3 wherein lasalocid is administered in the feed of said pig in an amount from about 20 p.p.m. to 60 p.p.m.

* * * * *